(12) United States Patent
Jaeb et al.

(10) Patent No.: US 8,646,479 B2
(45) Date of Patent: Feb. 11, 2014

(54) SINGULATION OF VALVES

(75) Inventors: Jonathan Jaeb, Boeme, TX (US);
Stuart Hatfield, Cambridge (GB)

(73) Assignee: KCI Licensing, Inc., San Antonio, TX (US)

( * ) Notice: Subject to any disclaimer, the term of this patent is extended or adjusted under 35 U.S.C. 154(b) by 401 days.

(21) Appl. No.: 12/699,672

(22) Filed: Feb. 3, 2010

(65) Prior Publication Data

US 2011/0186765 A1    Aug. 4, 2011

(51) Int. Cl.
*F16K 15/02* (2006.01)
*B21K 1/20* (2006.01)

(52) U.S. Cl.
USPC .................. 137/512.15; 137/859; 29/890.126

(58) Field of Classification Search
USPC ......... 137/512.15, 512.4, 517, 843, 851, 852, 137/859; 29/890.12, 890.122, 890.126, 33 B
See application file for complete search history.

(56) References Cited

U.S. PATENT DOCUMENTS

| | | | | |
|---|---|---|---|---|
| 1,350,610 | A * | 8/1920 | Henig | 137/516.11 |
| 4,164,238 | A * | 8/1979 | Riedel | 137/512.15 |
| 4,188,978 | A * | 2/1980 | De Lorenzo | 137/859 |
| 4,523,610 | A * | 6/1985 | Orrico | 137/512.15 |
| 5,372,487 | A * | 12/1994 | Pekar | 417/480 |
| 5,819,785 | A * | 10/1998 | Bardini | 137/337 |
| 6,412,514 | B1 * | 7/2002 | Raftis | 137/111 |
| 7,080,660 | B2 * | 7/2006 | Jennings | 137/510 |
| 8,297,947 | B2 * | 10/2012 | Van Rensburg et al. | 417/413.2 |
| 2001/0035700 | A1 | 11/2001 | Percin et al. | |
| 2002/0103412 | A1 | 8/2002 | Trimmer | |
| 2004/0000843 | A1 | 1/2004 | East | |
| 2004/0234403 | A1 * | 11/2004 | Majerus et al. | 417/569 |
| 2007/0035213 | A1 | 2/2007 | Nakajima | |

FOREIGN PATENT DOCUMENTS

| | | |
|---|---|---|
| DE | 44 22 743 A1 | 1/1996 |
| EP | 1 180 604 A2 | 2/2002 |
| JP | 2009-156454 A | 7/2009 |
| WO | WO 94/19609 A | 9/1994 |
| WO | WO 2004/090335 A1 | 10/2004 |
| WO | WO 2006/111775 A | 10/2006 |
| WO | WO 2006/111775 A1 | 10/2006 |
| WO | WO 2009/072261 A1 | 6/2009 |
| WO | WO 2009/087714 A1 | 7/2009 |
| WO | WO 2009/112866 A1 | 9/2009 |
| WO | WO 2010/139916 A1 | 12/2010 |

OTHER PUBLICATIONS

International Search Report and Written Opinion date mailed Dec. 10, 2009; PCT International Application No. PCT/GB2009/050615.
International Search Report and Written Opinion date mailed May 25, 2011; International Patent Application No. PCT/US2011/023580.

* cited by examiner

*Primary Examiner* — John Rivell
*Assistant Examiner* — Hailey K Do

(57) ABSTRACT

A method and apparatus for the singulation of valve plates and/or assembled valves from a lead-frame are described. The method and apparatus utilizes an electric current to fuse tabs which join the valve plate and/or the assembled valve to the lead-frame. The valve comprises a first and second valve plate with offsetting apertures and a flap disposed and movable between the first and second plates.

7 Claims, 6 Drawing Sheets

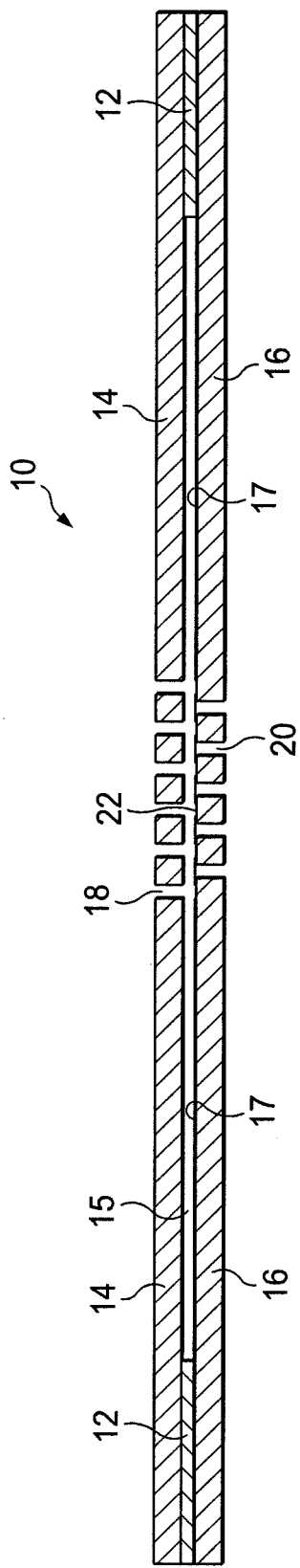
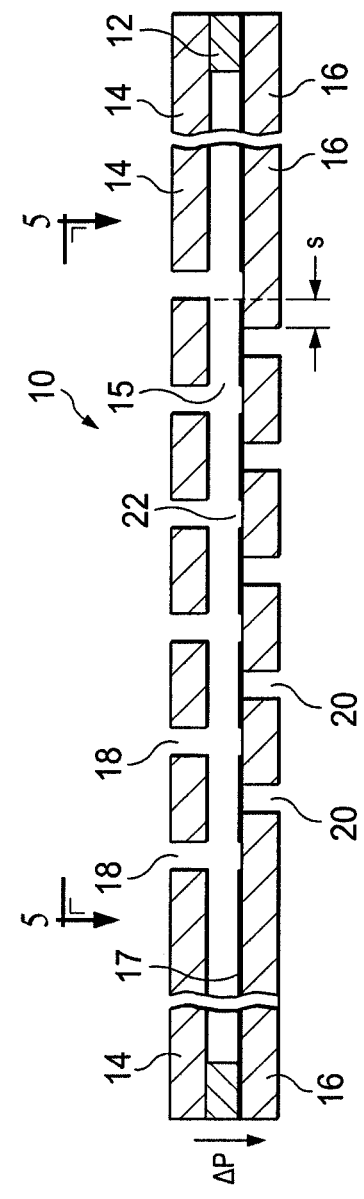
FIG. 1A
FIG. 1B

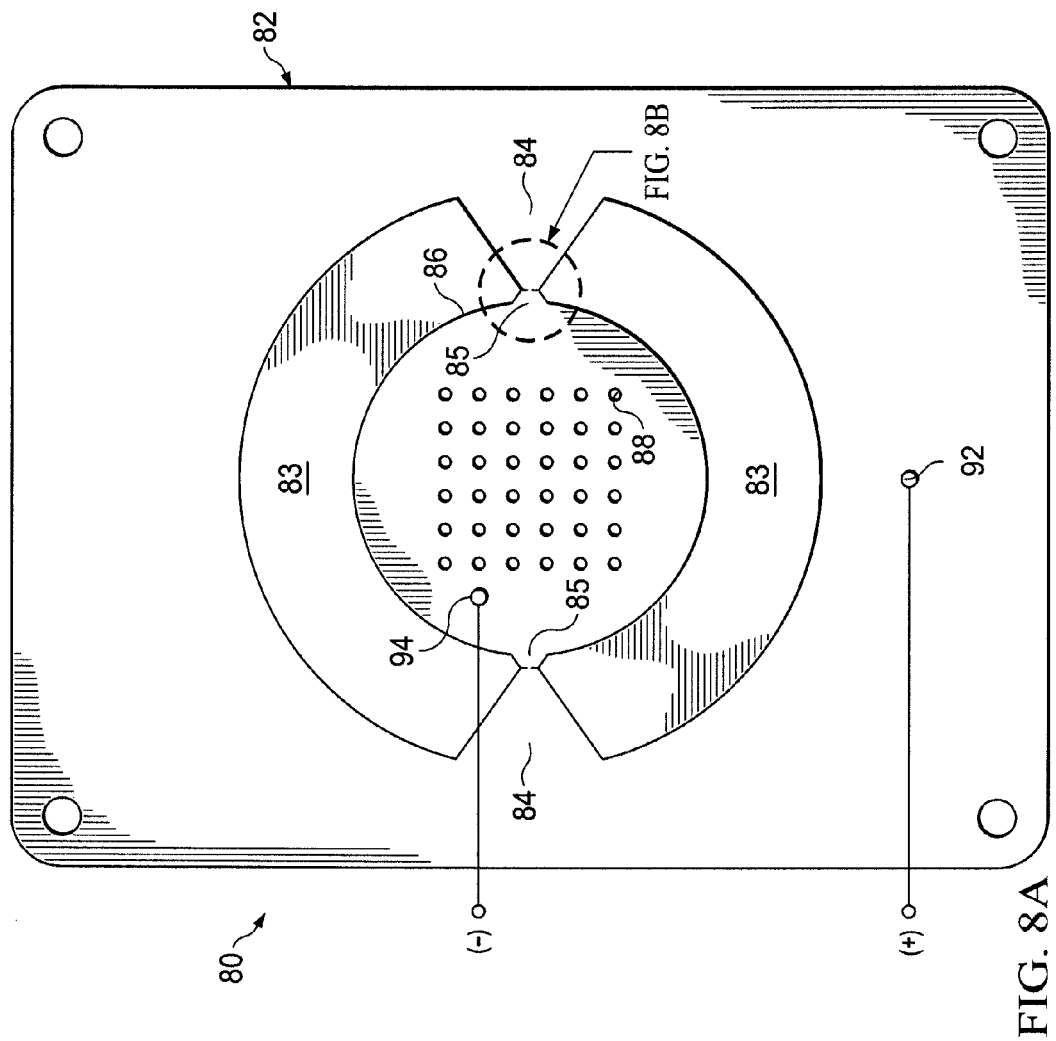
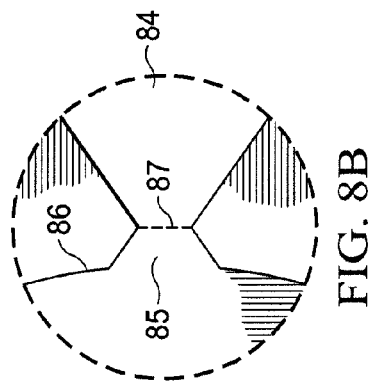
FIG. 8A
FIG. 8B

SINGULATION OF VALVES

BACKGROUND OF THE INVENTION

1. Field of the Invention

The illustrative embodiments relate generally to a valve for controlling fluid flow therethrough and, more specifically, to a valve having a flap that is disposed between two plates and capable of movement between an open and closed position.

2. Description of Related Art

Conventional valves typically operate at lower frequencies below 500 Hz for a variety of applications. For example, many conventional compressors typically operate at 50 or 60 Hz. A linear resonance compressor known in the art operates between 150 and 350 Hz. Such pumps are typically relatively large, and produce audible noise in operation. However, many portable electronic devices including medical devices require pumps for delivering a positive pressure or providing a vacuum that are relatively small in size and it is advantageous for such pumps to be inaudible in operation so as to provide discrete operation.

To achieve the objectives of small size, high efficiency, and inaudible operation, certain pumps (such as that described in International Patent Application No. PCT/GB2006/001487, published as WO 2006/111775) must operate at very high frequencies, in turn requiring valves that must operate at very high frequencies to be effective. Such pumps require valves capable of operating at much higher frequencies of around 20 kHz and higher which are not commonly available. To operate at these high frequencies, the valve must be responsive to a high frequency oscillating pressure that can be rectified to create a net flow of fluid through the pump.

A valve for controlling the flow of fluid that is capable of operating at such higher frequencies is disclosed. The valve comprises a first valve plate having apertures extending generally perpendicular therethrough and a second valve plate also having apertures extending generally perpendicular therethrough, wherein the apertures of the second valve plate are substantially offset from the apertures of the first valve plate. The valve further comprises a sidewall disposed between the first and second valve plates, wherein the sidewall is closed around the perimeter of the first and second valve plates to form a cavity between the first and second valve plates in fluid communication with the apertures of the first and second valve plates. The valve further comprises a flap disposed and moveable between the first and second valve plates, wherein the flap has apertures substantially offset from the apertures of the first valve plate and substantially aligned with the apertures of the second valve plate. The fabrication and handling of the valve plates may be facilitated by the use of certain lead-frame technology for the construction of the valve.

SUMMARY

A method and apparatus for using a lead-frame for the handling and fabrication of valve plates is disclosed. The lead-frame comprises an opening with tabs extending inwardly within the opening to support a valve plate that is subject to further fabrication and handling during the manufacturing process. An electrical current is applied to the lead-frame and the valve plate to fuse the tabs and singulate the valve plate from the lead-frame.

Other objects, features, and advantages of the illustrative embodiments are disclosed herein and will become apparent with reference to the drawings and detailed description that follow.

BRIEF DESCRIPTION OF THE DRAWINGS

FIG. 1A shows a schematic cross-section view of an illustrative embodiment of a valve in a closed position, and FIG. 1B shows an exploded, sectional view of the valve of FIG. 1A taken along line 1B-1B in FIG. 5;

FIG. 8A shows a schematic top view of a lead-frame including tabs for supporting a valve plate according to an illustrative embodiment; and FIG. 8B shows an exploded view of a tab supporting the valve plate of FIG. 8A.

DETAILED DESCRIPTION OF ILLUSTRATIVE EMBODIMENTS

In the following detailed description of several illustrative embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments are defined only by the appended claims.

Figure 2:
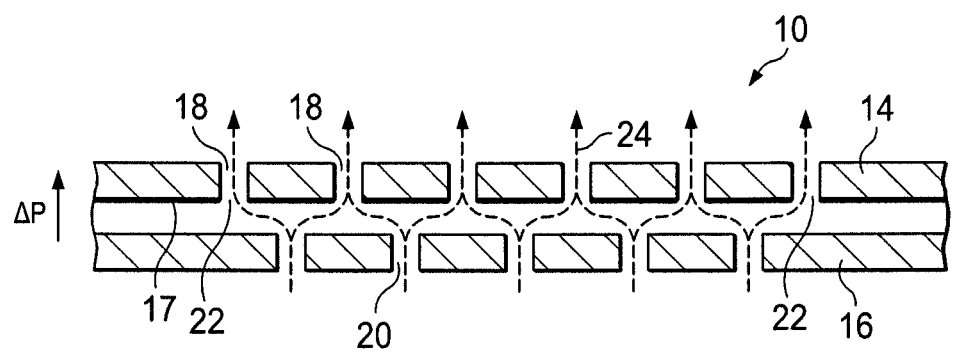
FIG. 2 shows a schematic cross-section view of the valve in FIG. 1B in an open position while fluid flows therethrough.
Figure 3:
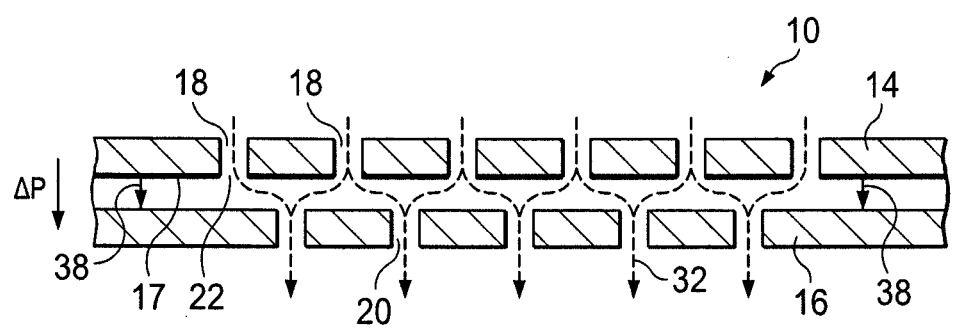
FIG. 3 shows a schematic cross-section view of the valve in FIG. 1B in transition between the open and closed positions.

Referring to FIGS. 1A to 5, a valve 10 is shown according to an illustrative embodiment. The valve 10 comprises a substantially cylindrical wall 12 that is ring-shaped and closed at one end by a retention plate 14 and at the other end by a sealing plate 16. The inside surface of the wall 12, the retention plate 14, and the sealing plate 16 form a cavity 15 within the valve 10. The valve 10 further comprises a substantially circular flap 17 disposed between the retention plate 14 and the sealing plate 16, but adjacent the sealing plate 16 as shown in FIGS. 1A and 1B. The flap 17 may be disposed adjacent the retention plate 14 in an alternative embodiment as will be described in more detail below, and in this sense the flap 17 is considered to be "biased" against either one of the sealing plate 16 or the retention plate 14. The peripheral portion of the flap 17 is sandwiched between the sealing plate 16 and the ring-shaped wall 12 so that the flap 17 is immobilized in a direction substantially perpendicular the surface of the flap 17. The peripheral portion of the flap 17 may also be attached directly to either the sealing plate 16 or the wall 12 in an alternative embodiment. The remainder of the flap 17 is sufficiently flexible and movable in a direction substantially perpendicular the surface of the flap 17, so that a force applied to either surface of the flap 17 will motivate the flap 17 between the sealing plate 16 and the retention plate 14 as shown in FIGS. 1B, 2 and 3.

The retention plate 14 and the sealing plate 16 both have holes 18 and 20, respectively, which extend through each plate as shown in the cross-sectional view of FIGS. 1-3. The flap 17 also has holes 22 that are generally aligned with the holes 18 of the retention plate 14 to provide a passage through which fluid, including a gas or liquid, may flow as indicated by the dashed arrows 24 in FIG. 2. The holes 22 in the flap 17 may also be partially aligned, i.e., having only a partial overlap, with the holes 18 in the retention plate 14. Although the holes 18, 20, 22 are shown to be of substantially uniform size and shape, they may be of different diameters or even different shapes without limiting the scope of the invention. In one embodiment of the invention, the holes 18 and 20 form an alternating pattern across the surface of the plates as shown by the solid and dashed circles, respectively, in FIGS. 4 and 5. In other embodiments, the holes 18, 20, 22 may be arranged in different patterns without affecting the operation of the valve 10 with respect to the functioning of the individual pairings of holes 18, 20, 22 is illustrated by individual sets of the dashed arrows 24, 36. The pattern of holes 18, 20, 22 may be designed to increase or decrease the number of holes to control the total flow of fluid through the valve 10 as required. For example, the number of holes 18, 20, 22 may be increased to reduce the flow resistance of the valve 10 to increase the total flow rate of the valve 10.

When no force is applied to either surface of the flap 17 to overcome the bias of the flap 17, the valve 10 is in a "normally closed" position because the flap 17 is biased against the sealing plate 16 and the holes 22 of the flap are offset or not aligned with the holes 18 of the sealing plate 16. In this "normally closed" position, the flow of fluid through the sealing plate 16 is blocked or covered by the non-perforated portions of the flap 17 as shown in FIG. 1B. When pressure is applied against either side of the flap 17 that overcomes the bias of the flap 17 and motivates the flap 17 away from the sealing plate 16 towards the retention plate 14 as shown in FIG. 2, the valve 10 moves from the normally closed position to an "open" position over a time period, an opening time delay ($T_o$), allowing fluid to flow in the direction indicated by the dashed arrows 24. When the pressure changes direction, the flap 17 will be motivated back towards the sealing plate 16 to the normally closed position. If the pressure changes direction, fluid will flow for a short time period, a closing time delay ($T_c$), in the opposite direction as indicated by the dashed arrows 32 shown in FIG. 3 until the flap 17 seals the holes 20 of the sealing plate 16 to block fluid flow through the sealing plate 16 as shown in FIG. 1B. In other embodiments of the invention, the flap 17 may be biased against the retention plate 14 with the holes 18, 22 aligned in a "normally open" position. In this embodiment, applying a positive pressure against the flap 17 will be necessary to motivate the flap 17 into a "closed" position.

The operation of the valve 10 is a function of the change in direction of the differential pressure ($\Delta P$) of the fluid across the valve 10. In FIG. 1B, the differential pressure has been assigned a negative value ($-\Delta P$) as indicated by the downward pointing arrow. In this embodiment, when the differential pressure has a negative value ($-\Delta P$), the fluid pressure on the retention plate side 34 of the valve 10 is greater than the fluid pressure on the sealing plate side 36 of the valve 10. This negative differential pressure ($-\Delta P$) drives the flap 17 into the fully closed position as described above wherein the flap 17 is pressed against the sealing plate 16 to block the holes 20 in the sealing plate 16, thereby preventing the flow of fluid through the valve 10. When the differential pressure across the valve 10 reverses to become a positive differential pressure ($+\Delta P$) as indicated by the upward pointing arrow in FIG. 2, the flap 17 is motivated away from the sealing plate 16 and towards the retention plate 14 into the open position. In this embodiment, when the differential pressure has a positive value ($+\Delta P$), the fluid pressure on the sealing plate side 36 of the valve 10 is greater than the fluid pressure on the retention plate side 34 of the valve 10. In the open position, the movement of the flap 17 unblocks the holes 20 of the sealing plate 16 so that fluid is able to flow through them and the aligned holes 22 and 18 of the flap 17 and the retention plate 14, respectively, as indicated by the dashed arrows 24.

When the differential pressure across' cross the valve 10 changes back to a negative differential pressure ($-\Delta P$) as indicated by the downward pointing arrow in FIG. 3, fluid begins flowing in the opposite direction through the valve 10 as indicated by the dashed arrows 32, which forces the flap 17 back toward the closed position shown in FIG. 1B. In FIG. 3, the fluid pressure between the flap 17 and the sealing plate 16 is lower than the fluid pressure between the flap 17 and the retention plate 14. Thus, the flap 17 experiences a net force, represented by arrows 38, which accelerates the flap 17 toward the sealing plate 16 to close the valve 10. In this manner, the changing differential pressure cycles the valve 10 between closed and open positions based on the direction (i.e., positive or negative) of the differential pressure across the valve 10. It should be understood that the flap 17 could be biased against the retention plate 14 in an open position when the valve 10 is not in use depending upon the application of the valve 10, i.e., the valve 10 would then be in a "normally open" position.

Figure 6:
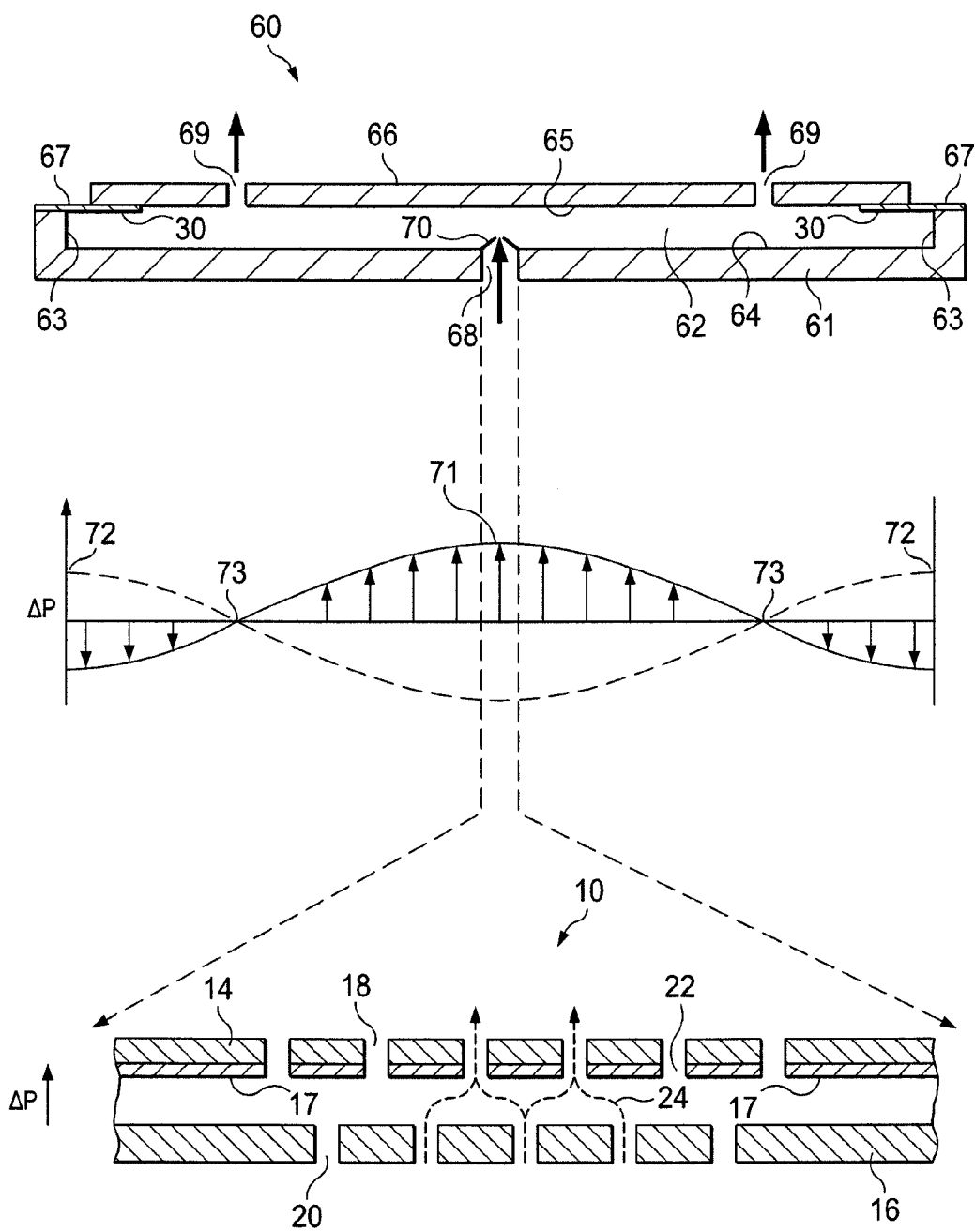
FIG. 6 shows a schematic cross-section view of a disc pump utilizing a valve, a graph of pressure oscillations of fluid within the pump, and an exploded cross-sectional view of the valve of FIG. 1B in an open position as utilized in the pump.

As indicated above, the valve 10 may be used in a pump that operates at extremely high frequencies, beyond the range of human hearing. At such frequencies, the pump may be extremely small in size and suitable for integration into a wide range of portable electronic devices where pressure or vacuum delivery is required. Such a pump 60 is shown in FIG. 6. The pump 60 comprises a pump body 61 having a substantially cylindrical shape cavity 62 formed by a side wall 63 and closed at both ends by substantially circular end walls 64, 65 for containing a fluid. The pump 60 further comprises an actuator 66 operatively associated with the central portion of the end wall 65 to cause an oscillatory motion of the end wall 65 in a direction substantially perpendicular thereto with maximum amplitude at about the center of the end wall 65, thereby generating displacement oscillations of the end wall 65 when in use. The pump 60 further comprises an isolator 67 operatively associated with the peripheral portion of the end wall 65 to reduced dampening of displacement oscillations caused by the end wall's 65 connection to the side wall 63 of the cavity 62. The pump 60 further comprises a central aperture 68 disposed at about the center of the end wall 64 and two secondary apertures 69 disposed between the center of the end wall 65 and the side wall 63. When the actuator 66 generates an oscillatory motion of the end wall 65, the displacement oscillations generate radial oscillations of the fluid pressure within the cavity 62 of the pump body 61 causing fluid flow through the apertures 68, 69 as indicated by the arrows. The pump 60 also comprises a valve 70 disposed in the central aperture 68 that allows fluid to flow through the central aperture 68 in only one direction. For this valve 70 to operate at high frequencies generated by the actuator 66, the valve 70 must have an extremely fast response time such that it is able to open and close on a time scale significantly shorter than the time scale of the pressure variations. One embodiment of the valve 70 that can be used is the valve 10 shown in FIG. 6 in an exploded view.

The valve 10 is disposed within the central aperture 68 so that the fluid is drawn into the cavity 62 through the primary aperture 68 and expelled from the cavity 62 through the secondary apertures 69 as indicated by the solid arrows, thereby providing a source of reduced pressure at the primary aperture 68. The term "reduced pressure" as used herein generally refers to a pressure less than the ambient pressure where the pump 60 is located. Although the term "vacuum" and "negative pressure" may be used to describe the reduced pressure, the actual pressure reduction may be significantly less than the pressure reduction normally associated with a complete vacuum. The pressure is "negative" in the sense that it is a gauge pressure, i.e., the pressure is reduced below ambient atmospheric pressure. Unless otherwise indicated, values of pressure stated herein are gauge pressures. References to increases in reduced pressure typically refer to a decrease in absolute pressure, while decreases in reduced pressure typically refer to an increase in absolute pressure.

FIG. 6 also shows one possible pressure oscillation profile illustrating the pressure oscillation within the cavity 62 resulting from the axial displacement oscillations of the end wall 65. The solid curved line and arrows represent the pressure at one point in time, and the dashed curved line represents the pressure one half-cycle later. In this mode and higher-order modes, the amplitude of the pressure oscillations has a central pressure anti-node 71 near the centre of the cavity 62 and a peripheral pressure anti-node 72 near the side wall 63 of the cavity 62. The amplitude of the pressure oscillations is substantially zero at an annular pressure node 73 between the central pressure anti-node 71 and the peripheral pressure anti-node 72. For a cylindrical cavity, the radial dependence of the amplitude of the pressure oscillations in the cavity 62 may be approximated by a Bessel function of the first kind. The pressure oscillations described above result from the radial movement of fluid in the cavity 62, and so will be referred to as the "radial pressure oscillations" of the fluid within the cavity 62 as distinguished from the "axial displacement oscillations" of the actuator 66.

The fluid flow through the primary aperture 68 as indicated by the solid arrow pointing upwards corresponds to the fluid flow through the holes 18, 20 of the valve 10 as indicated by the dashed arrows that also point upwards. As indicated above, the operation of the valve 10 is a function of the change in direction of the differential pressure ($\Delta P$) of the fluid across the entire surface of the retention plate 14 of the valve 10 for this embodiment of a negative pressure pump. The differential pressure ($\Delta P$) is assumed to be substantially uniform across the entire surface of the retention plate 14 because the diameter of the retention plate 14 is small relative to the wavelength of the pressure oscillations in the cavity 62 and furthermore because the valve is located in the primary aperture 68 near the centre of the cavity 62 where the amplitude of the central pressure anti-node 71 is relatively constant. When the differential pressure across the valve 10 reverses to become a positive differential pressure ($+\Delta P$) corresponding to FIG. 2, the biased flap 17 is motivated away from the sealing plate 16 towards the retention plate 14 into the open position. In this position, the movement of the flap 17 unblocks the holes 20 of the sealing plate 16 so that fluid is permitted to flow through them and the aligned holes 18 of the retention plate 14 and the holes 22 of the flap 17 as indicated by the dashed arrows 24. When the differential pressure changes back to the negative differential pressure ($-\Delta P$), fluid begins to flow in the opposite direction through the valve 10 (see FIG. 3), which forces the flap 17 back toward the closed position (see FIG. 1B). Thus, as the pressure oscillations in the cavity 62 cycle the valve 10 between the normally closed and open positions, the pump 60 provides a reduced pressure every half cycle when the valve 10 is in the open position.

Figures 7A, 7B:
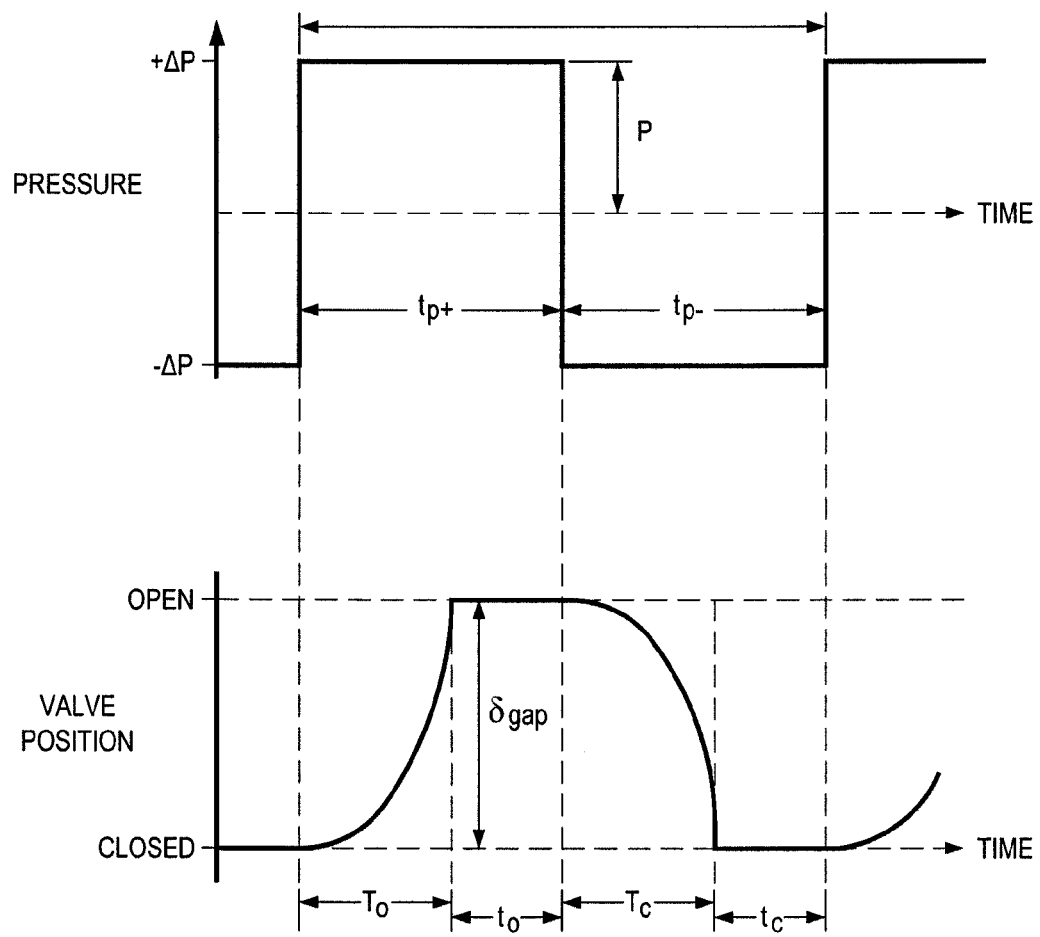
FIG. 7A shows a graph of an oscillating differential pressure applied across the valve of FIG. 1B according to an illustrative embodiment.
FIG. 7B shows a graph of an operating cycle of the valve of FIG. 1B between an open and closed position.

The differential pressure ($\Delta P$) is assumed to be substantially uniform across the entire surface of the retention plate 14 because it corresponds to the central pressure anti-node 71 as described above, therefore being a good approximation that there is no spatial variation in the pressure across the valve 10. While in practice the time-dependence of the pressure across the valve may be approximately sinusoidal, in the analysis that follows it shall be assumed that the cycling of the differential pressure ($\Delta P$) between the positive differential pressure ($+\Delta P$) and negative differential pressure ($-\Delta P$) values can be approximated by a square wave over the positive pressure time period ($t_{P+}$) and the negative pressure time period ($t_{P-}$), respectively, as shown in FIG. 7A. As differential pressure ($\Delta P$) cycles the valve 10 between the normally closed and open positions, the pump 60 provides a reduced pressure every half cycle when the valve 10 is in the open position subject to the opening time delay ($T_o$) and the closing time delay ($T_c$) as also described above and as shown in FIG. 7B. When the differential pressure across the valve 10 is initially negative with the valve 10 closed (see FIG. 1B) and reverses to become a positive differential pressure ($+\Delta P$), the biased flap 17 is motivated away from the sealing plate 16 towards the retention plate 14 into the open position (see FIG. 2) after the opening time delay ($T_o$). In this position, the movement of the flap 17 unblocks the holes 20 of the sealing plate 16 so that fluid is permitted to flow through them and the aligned holes 18 of the retention plate 14 and the holes 22 of the flap 17 as indicated by the dashed arrows, thereby providing a source of reduced pressure outside the primary aperture 68 of the pump 60 over an open time period ($t_o$). When the differential pressure across the valve 10 changes back to the negative differential pressure ($-\Delta P$), fluid begins to flow in the opposite direction through the valve 10 (see FIG. 3) which forces the flap 17 back toward the closed position after the closing time delay ($T_c$). The valve 10 remains closed for the remainder of the half cycle or closed time period ($t_c$).

The retention plate 14 and the sealing plate 16 should be strong enough to withstand the fluid pressure oscillations to which they are subjected without significant mechanical deformation. The retention plate 14 and the sealing plate 16 may be formed from any suitable rigid material such as glass, silicon, ceramic, or metal. The holes 18, 20 in the retention plate 14 and the sealing plate 16 may be formed by any suitable process including chemical etching, laser machining, mechanical drilling, powder blasting, and stamping. In one embodiment, the retention plate 14 and the sealing plate 16 are formed from sheet steel between 100 and 200 microns thick, and the holes 18, 20 therein are formed by chemical etching. The flap 17 may be formed from any lightweight material, such as a metal or polymer film. In one embodiment, when fluid pressure oscillations having a frequency of 20 kHz or greater are present on either the retention plate side 34 or the sealing plate side 36 of the valve, the flap 17 may be formed from a thin polymer sheet between 1 micron and 20 microns in thickness. For example, the flap 17 may be formed from polyethylene terephthalate (PET) or a liquid crystal polymer film approximately 3 microns in thickness.

As indicated above, the retention plate 14 and the sealing plate 16 are very small and difficult to handle when being fabricated and assembled as part of the valve 10. The fabrication and handling of small metal plates for construction of the valve 10 is facilitated by using a larger lead-frame. Such lead-frame assemblies may support just one valve plate or an array of many valve plates in a matrix arrangement. Several lead-frame assemblies with an array of valve plates may be stacked, one on top of the other, to facilitate the assembly of the valve 10 by providing a convenient means for aligning the retention plates 14, sealing plates 16, walls 12, and flaps 17 of many valves 10 at one time as part of the assembly process.

Figure 4:
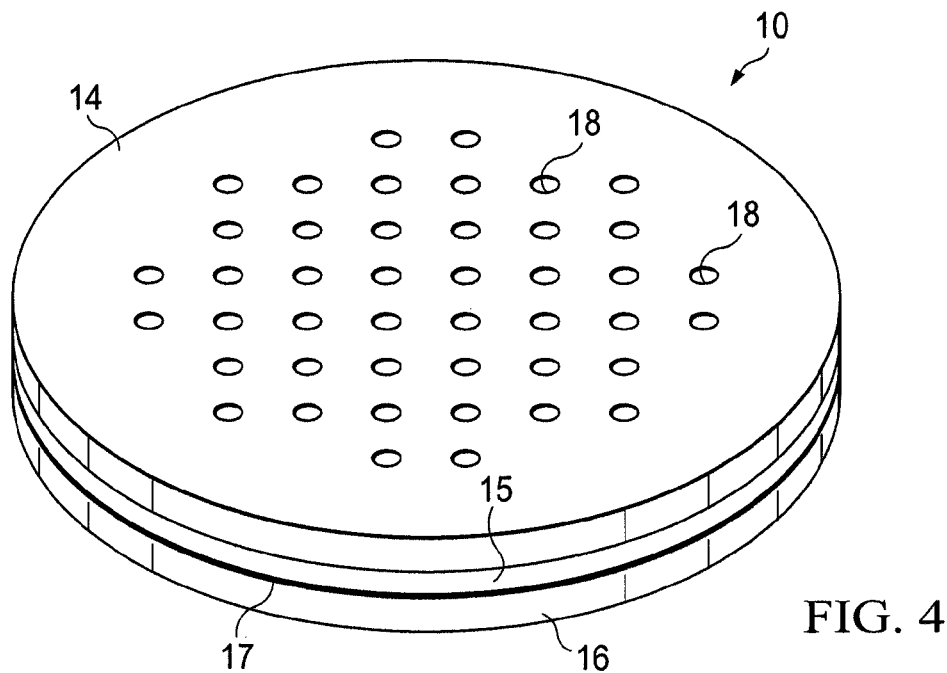
FIG. 4 shows a schematic perspective view of the valve of FIG. 1B.
Figure 5:
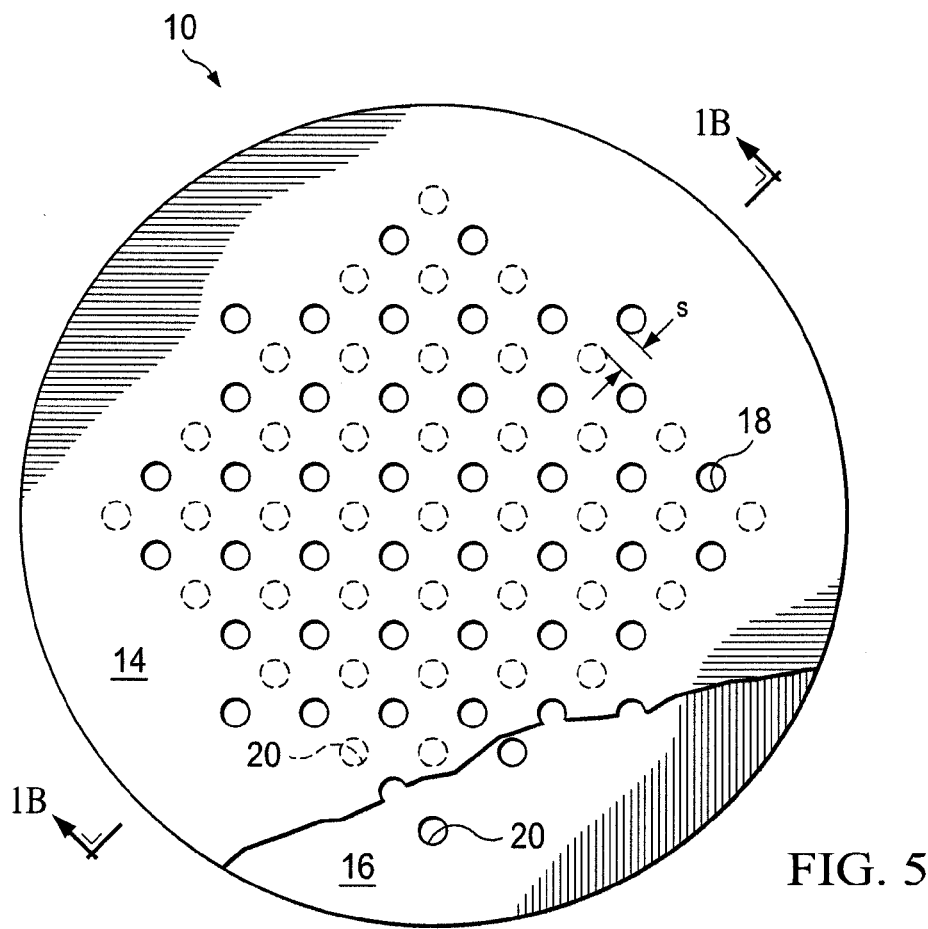
FIG. 5 shows a schematic top view of the valve of FIG. 1B.

Referring more specifically to FIG. 8, a lead-frame assembly 80 is shown and comprises a single lead-frame 82 having an opening 83 and two triangular shaped tabs 84 extending inwardly within the opening 83 to support a valve plate 86. The lead-frame 82 and the valve plate 86 are constructed from the same piece of sheet metal wherein the openings 83 are formed by chemical etching, laser cutting, die cutting, or similar processes known in the art. The valve plate 86 may be supported by any number of tabs 84 necessary for handling and fabricating the valve plate 86. The lead-frame 82 is used to hold the valve plate 86 in a fixed position so that the valve plate 86 can be subjected to various processes such as forming holes 88 by chemical etching, laser machining, or mechanical drilling, to form a finished valve plate such as, for example, the retention plate 14 and the sealing plate 16 as shown in FIGS. 4 and 5. The openings 83 and the holes 88 in the valve plate 86 may be formed in one chemical etching process.

The tabs 84 can be of any shape, but have a relatively small neck portion 85 of material connected to the valve plate 86 to provide support for the valve plate 86. The neck portion 85 of the tabs 84 are designed to be sufficiently narrow so that the valve plate 86 can be broken away from the tabs 84 when twisted to detach the valve plate 86 from the lead-frame 82 as a separate component, i.e., the valve plate 86 is singulated from the lead-frame 82. Twisting the valve plate 86 fatigues the neck portion 85 of the tabs 84, but may also distort or otherwise damage the valve plate 86 in the process. When several valve, plates 86 are stacked, one on top of the other, and bonded together to form a valve 10, even more distortion or other damage may occur to the valve plates 86 during the twisting. Additionally, twisting the valve plate 86 becomes more problematic if the lead-frame 82 utilizes more than two tabs 84.

Rather than twisting the valve plates 86 or cutting the neck portion 85 of the tabs 84, an electrical current may be applied through the tabs 84 to fuse the neck portion 85 of the tabs 84 to singulate the valve plate 86 from the lead-frame 82. Such a method has the benefit of avoiding distortion of the valve plate 86. For example, successful results have been achieved using a heating circuit (not shown) comprising a high-current, low-voltage power supply having a rating, for example, of 10V and 50 A. Alternatively a capacitor discharge circuit employing, for example, a capacitor of 22,000 μF charged to a voltage of 24V may be used to heat and fuse the neck portion 85. In the latter case the capacitor discharge circuit is electrically connected to contact point 92 on the lead-frame 82 and contact point 94 on the valve plate 86. The electrical contact points 92, 94 may be positioned on either side of the lead-frame 80 and the valve plate 86. When the capacitor is charged to 24V, the capacitor can be discharged through the tabs 84 and the neck portion 85 to the valve plate 86. The current generates enough heat to melt the neck portion 85 of the tabs 84 to singulate the valve plate 86 from the lead-frame 82. Nitrogen gas may be used to envelope the electrical contact points 92, 94 and the neck portion 85 of the tabs 84 to mitigate oxidation of the metal and ejection of debris from the fusing site during the fusing process. The neck portion 85 of the tabs 84 should be sufficiently narrow to ensure that the neck portion 85 fuses when a predetermined current is applied to the lead-frame 82 and the valve plate 86. For the example described above, the width of the neck portion 85 of the tabs 84 is about 150 μm.

In one preferred embodiment, the neck portion 85 of the tabs 84 may be etched so that the thickness of the neck portion 85 is reduced to facilitate the fusing process. The etching step better defines the point at which fusing occurs, because the current density increases at that location. Another advantage of etching the neck portion 85 of the tab 84 is that it reduces the amount of current required to fuse the tab 84 and the amount of heat necessary to melt the neck 85 portion of the tab 84. Reducing the amount of heat mitigates distortion of the valve plate 86 adjacent the neck portion 85 of the tabs 84 that may result from the fusing process. In the example above, the etching in the neck portion 85 of the tabs 84 is between about 50 and 90 μm deep. In a further preferred embodiment, the tabs 84 may be recessed towards the center of the valve plate 86 such that the radius of the neck portion 85 of the tabs 84 lies within the main outer diameter of the valve plate 86. Such a design ensures that the part of the tab 84 which remains attached to the valve plate 86 does not project beyond the main outer diameter of the valve plate 86 following singulation of the valve plate 86, facilitating the later handling and assembly of the valve plate 86.

The manufacturing and fabrication of valves 10 may include the stacking of several lead-frame assemblies 80, wherein the valve plates 86 have already been processed to form the holes 88 for the retention plates 14 and sealing plates 16. For example, a plurality of flaps 17 is positioned on a first lead-frame assembly supporting a plurality of sealing plates 14 so that the holes 22 of each flap 17 are accurately offset from the holes 20 of each sealing plate 16. A second lead-frame assembly supporting a plurality of cylindrical walls 12 is positioned on the first lead-frame assembly supporting the flaps 17. A third lead-frame assembly supporting a plurality of retention plates 14 are accurately aligned with the holes 22 of each flap 17. Consequently, the stacking of each sealing plate 16, flap 17, cylindrical wall 12, and retention plate 14 forms a single valve 10 assembly as shown in FIGS. 4 and 5, each one of which is supported by three pairs of tabs 84 (not shown), one pair for the sealing plate 16, one pair for the retention plate 14, and one pair for the cylindrical wall 12 (not shown). Once these plates have been aligned, the parts of each valve 10 may be bonded together to form individual valve assemblies. This stacking of lead-frame assemblies 80 includes the flaps 17, each of which is a thin polymer sheet that functions as an insulator between the retention plates 14 and the sealing plates 16 of the valves 10. When the stacking includes these insulating layers, or there is otherwise poor conductivity through a stack of each valve 10 assembly without insulating layers, the electrical contact points 92, 94 may be placed on both the top and bottom of the stack so that the current is distributed more uniformly through the stack to fuse all the neck portions 85 of the tabs 84 to successfully signulate all the valve 10 assemblies from the tabs 84.

It should be apparent from the foregoing that an invention having significant advantages has been provided. While the invention is shown in only a few of its forms, it is not just limited but is susceptible to various changes and modifications without departing from the spirit thereof.

We claim:

1. A valve for controlling the flow of fluid, said valve comprising:
    a first valve plate having apertures extending therethrough and at least two tabs extending from a periphery thereof, the tabs having a neck portion configured to be electrically fused;

a second valve plate having apertures extending therethrough and substantially offset from the apertures of said first valve plate, the second valve plate having at least two tabs extending from the periphery thereof, the tabs having a neck portion configured to be electrically fused, the tabs of the second valve plate being coupled to the tabs of the first valve plate as a result of being electrically fused;

a spacer disposed between said first valve plate and said second valve plate to form a cavity therebetween in fluid communication with the apertures of said first valve plate and the apertures of said second valve plate; and a flap disposed and moveable between said first valve plate and said second valve plate in response to fluid pressure oscillations having a frequency of about 20 kHz or greater, said flap being a polymer and having apertures substantially offset from the apertures of said first valve plate and substantially aligned with the apertures of said second valve plate, said apertures of said flap having a substantially elliptical shape.

2. A valve according to claim 1, wherein the apertures in said first valve plate are less than about 500 microns in diameter.

3. A valve according to claim 1, wherein said flap is formed from a polymer having a thickness of about 3 microns and the apertures in said first valve plate are less than about 150 microns in diameter.

4. A valve according to claim 1, wherein said first and second valve plates are formed from steel having a thickness of about 100 microns, and wherein the apertures of said first valve plate, the aperture of said second valve plate, and the apertures of said flap are about 150 microns in diameter, and wherein said flap is formed from a polymer film having a thickness of about 3 microns.

5. The valve of claim 1, wherein said flap is disposed adjacent either one of said first and second valve plates in a first position when the differential pressure is substantially zero and movable to the other one of said first and second valve plates in a second position when a differential pressure is applied, whereby said flap is motivated from the first position to the second position in response to a change in direction of the differential pressure of the fluid outside said valve and back to the first position in response to a reversal in the direction of the differential pressure of the fluid.

6. The valve of claim 5, wherein said flap is disposed adjacent said second valve plate in a normally open position, whereby the fluid flows through said valve when said flap is in the first position and the flow of the fluid is blocked by said valve when said flap is in the second position.

7. The valve of claim 5, wherein said flap is disposed adjacent said first valve plate in a normally closed position, whereby the flow of the fluid is blocked by said valve when said flap is in the first position and the fluid flows through said valve when said flap is in the second position.

* * * * *